United States Patent
Ouyang et al.

(10) Patent No.: US 11,775,521 B2
(45) Date of Patent: Oct. 3, 2023

(54) EFFICIENT WORKLOAD BALANCING IN REPLICATED DATABASES BASED ON RESULT LAG COMPUTATION

(71) Applicant: SAP SE, Walldorf (DE)

(72) Inventors: Yinghua Ouyang, Xi'an (CN); Zhen Tian, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/118,943

(22) Filed: Mar. 8, 2023

(65) Prior Publication Data

US 2023/0222122 A1    Jul. 13, 2023

Related U.S. Application Data

(63) Continuation of application No. 17/722,104, filed on Apr. 15, 2022, now Pat. No. 11,625,397, which is a continuation of application No. 16/836,469, filed on Mar. 31, 2020, now Pat. No. 11,379,477.

(51) Int. Cl.
| | |
|---|---|
| *G06F 16/2453* | (2019.01) |
| *G06F 16/2458* | (2019.01) |
| *G06F 16/27* | (2019.01) |
| *G06F 16/23* | (2019.01) |
| *G06F 9/50* | (2006.01) |

(52) U.S. Cl.
CPC ...... *G06F 16/24542* (2019.01); *G06F 9/5083* (2013.01); *G06F 16/2379* (2019.01); *G06F 16/2471* (2019.01); *G06F 16/27* (2019.01)

(58) Field of Classification Search
None
See application file for complete search history.

(56) References Cited

U.S. PATENT DOCUMENTS

| | | |
|---|---|---|
| 10,162,721 B2 | 12/2018 | Lee et al. |
| 2003/0225760 A1 | 12/2003 | Ruuth et al. |
| 2007/0203910 A1 | 8/2007 | Ferguson et al. |
| 2014/0279897 A1 | 9/2014 | Bourbonnais et al. |
| 2017/0123929 A1 | 5/2017 | Helleren |
| 2018/0143881 A1 | 5/2018 | Singer et al. |
| 2018/0150368 A1 | 5/2018 | Lee et al. |
| 2019/0079841 A1 | 3/2019 | Lee et al. |
| 2019/0251008 A1 | 8/2019 | Yang et al. |
| 2019/0294519 A1 | 9/2019 | Garg et al. |
| 2019/0392067 A1 | 12/2019 | Sonawane et al. |
| 2021/0303572 A1 | 9/2021 | Quyang et al. |

*Primary Examiner* — Christopher J Raab
(74) *Attorney, Agent, or Firm* — Klarquist Sparkman, LLP

(57) ABSTRACT

A method for workload balancing is implemented in a computer system including a primary database system and a secondary database system, the secondary database system being configured as a backup system for the primary database system. The method includes compiling a query received from a client application. The query indicates one or more source tables have corresponding replicate tables. The compiling comprises replace the one or more source tables with the corresponding replicate tables. The method can generate a query execution plan based on the compiled query, determine a per-table result lag based on minimum commit times of the corresponding replicate tables, and compare the per-table result lag with a predefined threshold. Responsive to a determination that the per-table result lag exceeds the predefined threshold, the method can recompile the query by falling back to the one or more source tables from the corresponding replicate tables.

20 Claims, 10 Drawing Sheets

EFFICIENT WORKLOAD BALANCING IN REPLICATED DATABASES BASED ON RESULT LAG COMPUTATION

CROSS-REFERENCE TO RELATED APPLICATIONS

The present application is a continuation of U.S. patent application Ser. No. 17/722,104, filed Apr. 15, 2022, which is a continuation of U.S. patent application Ser. No. 16/836,469, filed Mar. 31, 2020, now U.S. Pat. No. 11,379,477, all of which are incorporated by reference herein.

TECHNICAL FIELD

The subject matter described herein relates to database systems and more particularly to workload balancing between database systems employing a primary database and a secondary database using enhanced techniques for calculating per-table result lag.

BACKGROUND

A database system includes a database and a database management system (DBMS). A database is an organized collection of data. A DBMS comprises computer software that executes on one or more processors and interacts with users, other applications, and a database to capture and analyze data. A DBMS may allow for the definition, creation, querying, update, and administration of databases.

SUMMARY

A computer system is configured to provide a database system. The computer system comprises one or more processors, a primary database system implemented by the one or more processors, and a secondary database system implemented by the one or more processors. The secondary database system is configured as a hot-standby system for the primary database system. The secondary database system is capable of providing at least a minimum amount of essential functionality of the primary database system during a disruption to the primary database system. The primary database system is configured by programming instructions, executable on the computer system, to cause the one or more processors to determine from a query request from a client application directed to the primary database system that workload from a query may be shifted to the secondary database system and instruct the client application to selectively direct the secondary database system to execute the query based on a computer per-table result lag.

These aspects and other embodiments may include one or more of the following features. The programming instructions to cause the one or more processors to determine from a query request from a client application directed to the primary database system that workload from a query may be shifted to the secondary database system comprises programming instructions to cause the one or more processors to identify all source tables implicated by the query having a corresponding replica table and determine the calculated per-table result lag based on a last commit time for each source table and a last replayed transaction commit timestamp for the corresponding replica table. With such variations, the per-table result lag can be a highest result lag value when there are numerous source tables each having a replica.

The programming instructions configured to cause the one or more processors to determine from a query request from a client application directed to the primary database system that workload from a query may be shifted to the secondary database system may comprise programming instructions to cause the one or more processors to determine that a routing hint in the query request indicates that workload from the query may be shifted to the secondary database system and determine that the query does not involve writing data. The programming instructions configured to cause the one or more processors to instruct the client application to direct the secondary database system to execute the query may comprise programming instructions to cause the one or more processors to provide the identity of the secondary database system to the client application.

The secondary database system may be configured by programming instructions, executable on the computer system, to cause the one or more processors to retrieve, responsive to receipt of the query from the client application, a replication delay parameter from the query wherein the replication delay parameter indicates the maximum acceptable replication delay for data responsive to the query. The secondary database system may further be configured by programming instructions, executable on the computer system, to retrieve the actual data lag for data responsive to the query, compare the actual data lag with the replication delay parameter, and provide the data responsive to query to the client application when the actual data lag does not exceed the replication delay parameter.

The secondary database system may be further configured by programming instructions, executable on the computer system, to cause the one or more processors to provide an indication to the client application to route the query to the primary database system when the actual data lag exceeds the replication delay parameter. The secondary database system may be further configured by programming instructions, executable on the computer system, to cause the one or more processors to provide the data responsive to query and a fallback indication to the client application when the actual data lag exceeds the replication delay parameter. The secondary database system may be further configured by programming instructions, executable on the computer system, to cause the one or more processors to provide a fallback indication and not provide the data responsive to the query to the client application when the actual data lag exceeds the replication delay parameter.

In another embodiment, a computer-implemented method in a computer system is provided. The computer system comprises a primary database system and a secondary database system. The secondary database system is configured as a backup system for the primary database system and is capable of providing at least a minimum amount of essential functionality of the primary database system during a disruption to the primary database system. The method comprises receiving by the primary database system a query request from a client application in advance of receiving a query, determining by the primary database system that a routing hint in the query request indicates that workload from the query may be shifted to the secondary database system, determining that execution of the query does not involve writing data, determining by the primary database system to instruct the client application to route the query to the secondary database system, and instructing, by the primary database system, the client application to route the query to the secondary database system.

These aspects and other embodiments may include one or more of the following features. Instructing the client application to route the query to the secondary database system may comprise providing the identity of the secondary database system to the client application. The method may further comprise receiving the query from the client application requesting data retrieval at the secondary database system while in a hot-standby mode of operation. The method may further comprise retrieving, by the secondary database system, a replication delay parameter from the query wherein the replication delay parameter indicates the maximum acceptable replication delay for data responsive to the query. The method may further comprise retrieving, by the secondary database system, the actual data lag for the data responsive to the query; comparing, by the secondary database system, the actual data lag with the replication delay parameter; and providing, by the secondary database system, the data responsive to the query when the actual data lag does not exceed the replication delay parameter. The method may further comprise providing an indication, by the secondary database system, to the client application to route the query to the primary database system when the actual data lag exceeds the replication delay parameter. The method may further comprise providing, by the secondary database system, the data responsive to the query and a fallback indication to the client application when the actual data lag exceeds the replication delay parameter. The method may further comprise providing, by the secondary database system, a fallback indication to the client application when the actual data lag exceeds the replication delay parameter.

In another embodiment, a non-transitory computer readable storage medium embodying programming instruction for performing a method is provided. The method comprises receiving by the primary database system a query request from a client application in advance of receiving a query, determining by the primary database system that a routing hint in the query request indicates that workload from the query may be shifted to the secondary database system wherein the secondary database system configured as a backup system for the primary database system that is capable of providing at least a minimum amount of essential functionality of the primary database system during a disruption to the primary database system, determining that execution of the query does not involve writing data, determining by the primary database system to instruct the client application to route the query to the secondary database system, and instructing, by the primary database system, the client application to route the query to the secondary database system.

These aspects and other embodiments may include one or more of the following features. Instructing the client application to route the query to the secondary database system may comprise providing the identity of the secondary database system to the client application. The method provided by the programming instructions embodied in the non-transitory computer readable storage medium may further comprise receiving the query from the client application requesting data retrieval at the secondary database system while in a hot-standby mode of operation. The method may further comprise retrieving, by the secondary database system, a replication delay parameter from the query wherein the replication delay parameter indicates the maximum acceptable replication delay for data responsive to the query; retrieving, by the secondary database system, the actual data lag for the data responsive to the query; comparing, by the secondary database system, the actual data lag with the replication delay parameter; and providing, by the secondary database system, the data responsive to the query when the actual data lag does not exceed the replication delay parameter. The method may further comprise providing an indication, by the secondary database system, to the client application to route the query to the primary database system when the actual data lag exceeds the replication delay parameter. The method may further comprise providing, by the secondary database system, the data responsive to the query and a fallback indication to the client application when the actual data lag exceeds the replication delay parameter.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. As an example, the subject matter described herein may provide increased average throughput for a database system during high workloads to reduce the likelihood that a request to the database system for data may be queued, buffered or rejected until sufficient system resources are available to complete the request. In addition, the current subject matter provides more precise result lag by calculating result lag on a per-table basis which can avoid/help reduce unnecessary query fallback to execute on source tables.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The subject matter described herein discloses apparatus, systems, techniques and articles that may provide increased average throughput capabilities for a database system during high workloads to reduce the likelihood that a request to the database system for data may be queued, buffered or rejected until sufficient system resources are available to complete the request. In some examples, apparatus, systems, techniques and articles disclosed herein utilize secondary, backup database systems to execute queries to reduce the workload of a primary database system. In some examples, systems and methods disclosed herein utilize a hint in a query request from an application to identify a query that may be candidate for execution by a secondary database system.

Figure 1:
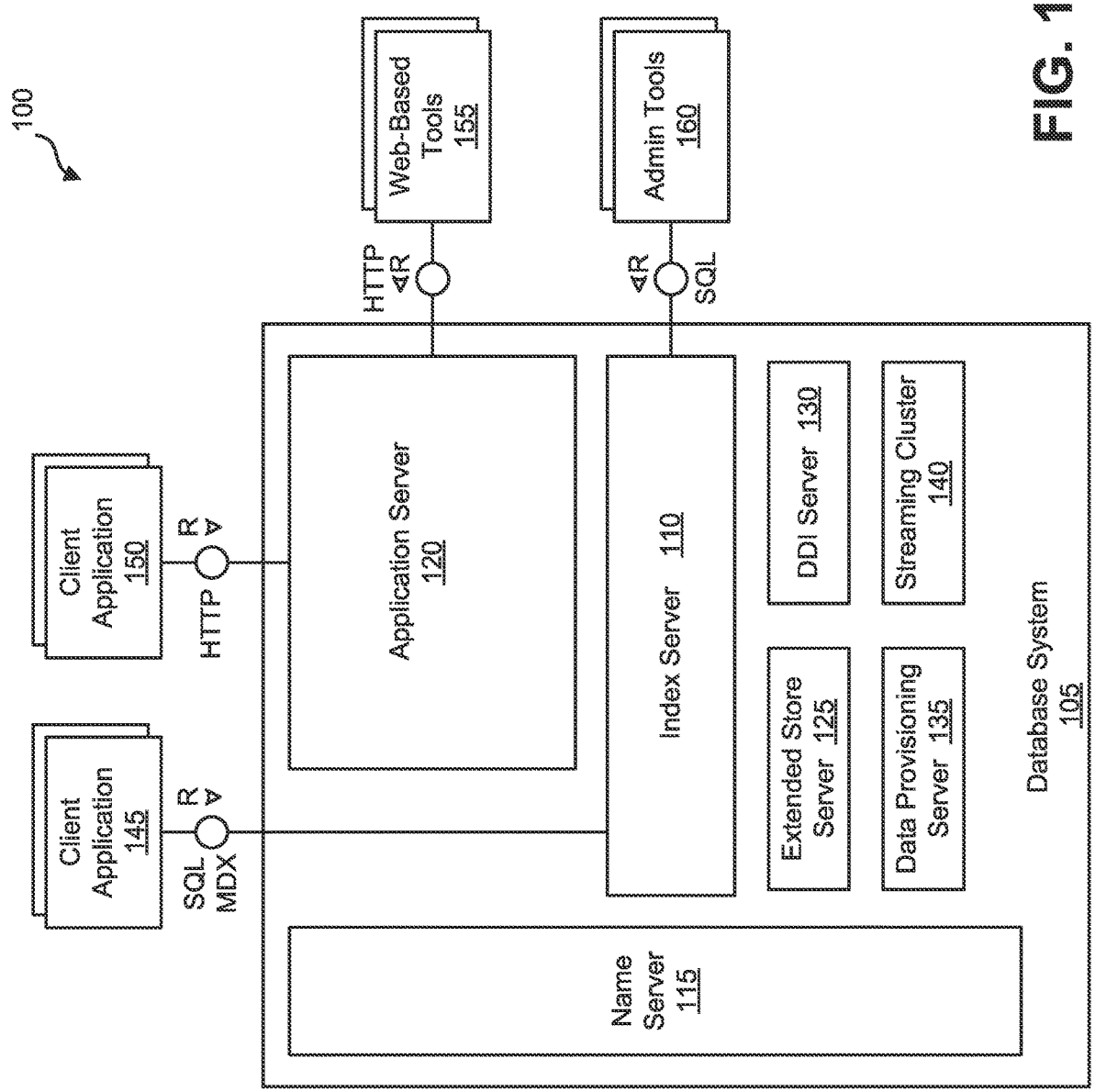
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durable. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers, and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
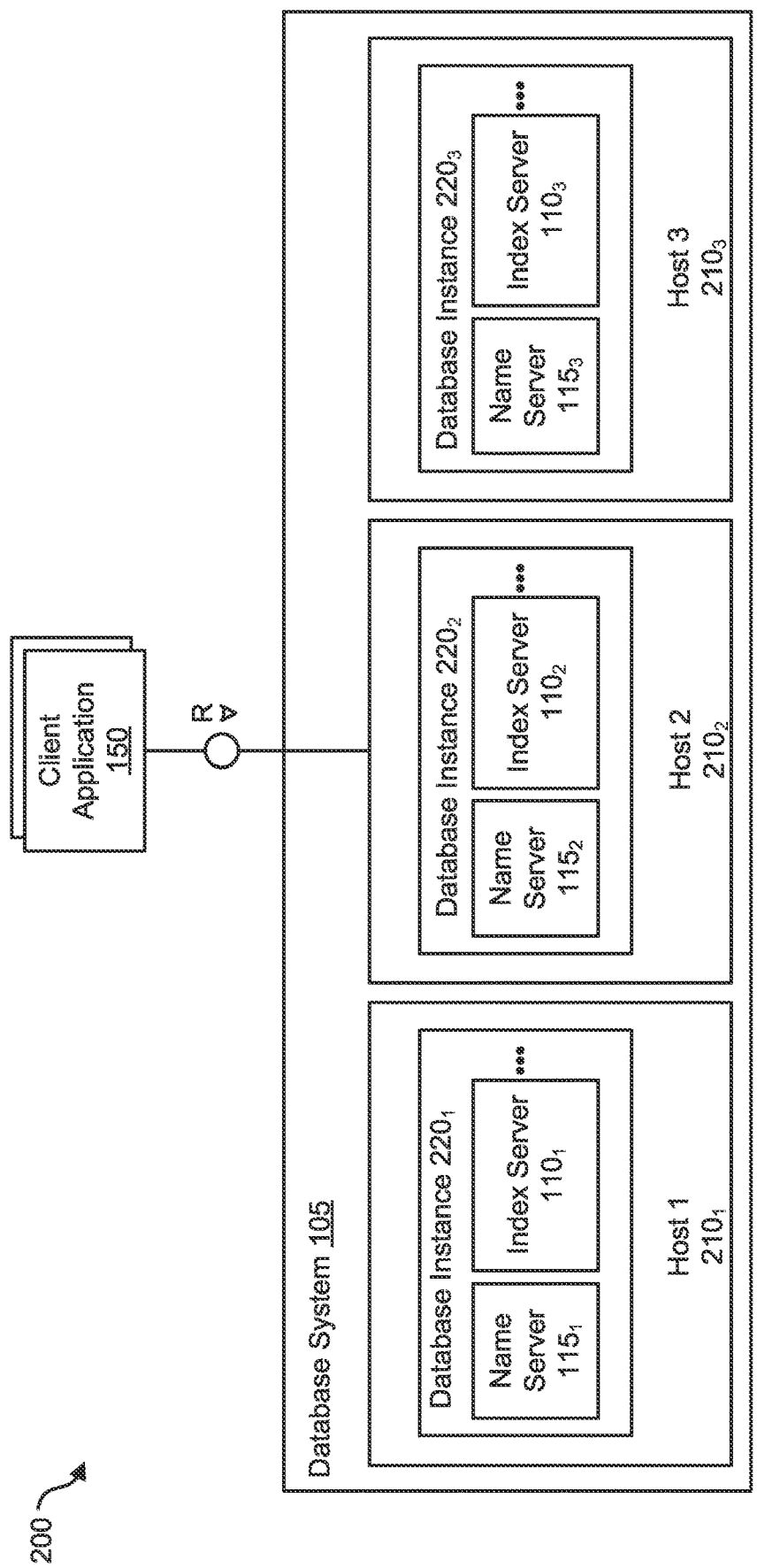
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
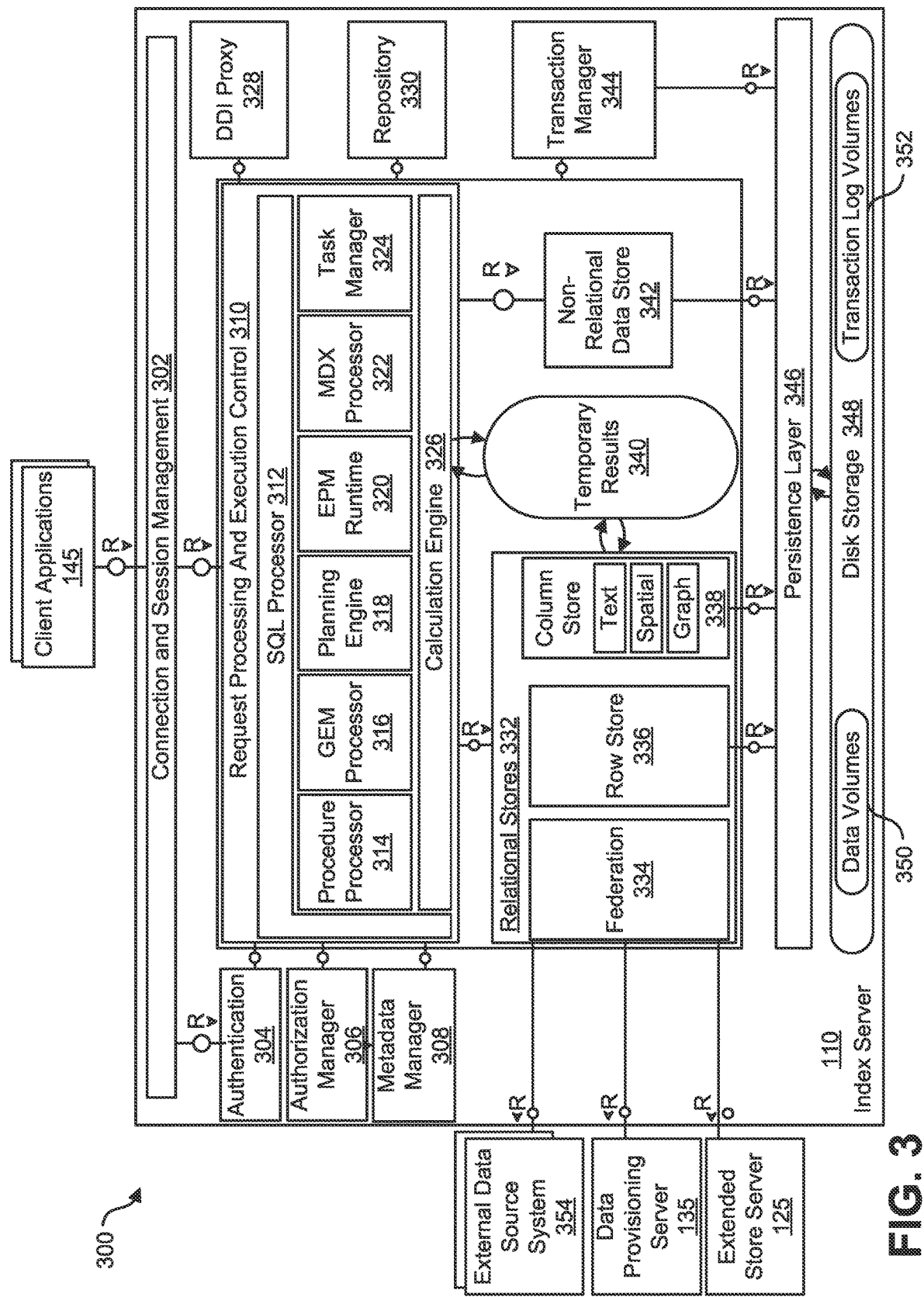
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, session variables, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked when a new connection with a client application 145 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 308, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 330, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQL processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can stores relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can stores relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which one may not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

In many applications, data systems may be required to support operations on a 24/7 schedule, and data system providers may be required to guarantee a maximum amount of downtime, that is time during which a system is not able to fully support ongoing operations. When a system is required to ensure an agreed level of operational performance, it may be referred to as a high availability system ("HA"). One solution to guarantee substantially continuous uptime with no, or very little, downtime is to maintain one or more hot-standby systems. A hot-standby system, or a backup system, is a system that may be activated quickly in the event of a disruption causing one or more functions of a primary operational data system to fail. Such a disruption may be referred to as a disaster, and the process of restoring a data system to full operations may be referred to as disaster-recovery ("DR").

A hot-standby system may be an exact replica of a primary operational system that is capable of providing all the functions provided by the primary operational system, or a hot-standby may be a system that is capable of providing a minimum amount of essential functionality during the time required to restore the primary operational data system. The time it takes after a disaster to restore full, or minimum, functionality of a data system, for example by bringing a hot-standby online, is referred to as recovery time. In an effort to minimize recovery time, and thereby downtime, a hot-standby system is typically in a state just short of fully operational. For example, a system architecture may be implemented in which all functional systems of the hot-standby are active and operational, and all system and data changes or updates occur in the primary operational system and the hot-standby at the exact same time. In such a case the only difference in the two systems may be that the primary is configured to respond to user requests and the hot-standby system is not. In other hot-standby systems one or more functions may be disabled until mission critical systems of the hot-standby are observed to be operating normally, at which time the remaining functions may be brought online.

In many applications, data systems may be required to provide prompt responses to users and applications that rely on the data managed by the data system. Providers and designers of data systems may be required to guarantee a minimum average throughput over time, or an average maximum response time. The speed with which a data system responds to a request from a user or an application may be dependent on many factors, but all systems are limited in the number of requests they can handle in a given period of time. When a data system manages a relatively large amount of data, and supports a relatively large number of users or applications, during high workloads a request may be queued, buffered or rejected until sufficient system resources are available to complete the request. When this happens, average throughput goes down and average response time goes up. One solution to such a problem is to distribute the workload across multiple processing systems. This is known as load balancing.

One drawback to load balancing in HA systems is that load balancing may require additional processing systems, which in turn have a high cost. It is often the case with certain data systems supporting critical functions of an organization that additional systems are needed to perform both load balancing and HA functionality to efficiently support continuous operations. Given the redundant nature of DR systems, hot-standby systems are often left undisturbed unless a disaster occurs. Thus, in some circumstances, it is desirable to implement and maintain a combination high availability/disaster recovery (HA/DR) system with load balancing that includes both a primary operational system and a hot-standby system, and potentially one or more tertiary systems. Such a combination system allows for load balancing of workload between the processing systems of both the primary operational system and the hot-standby system, without disrupting the ability of the hot-standby system to assume primary functionality in the event of a disaster.

Figure 4:
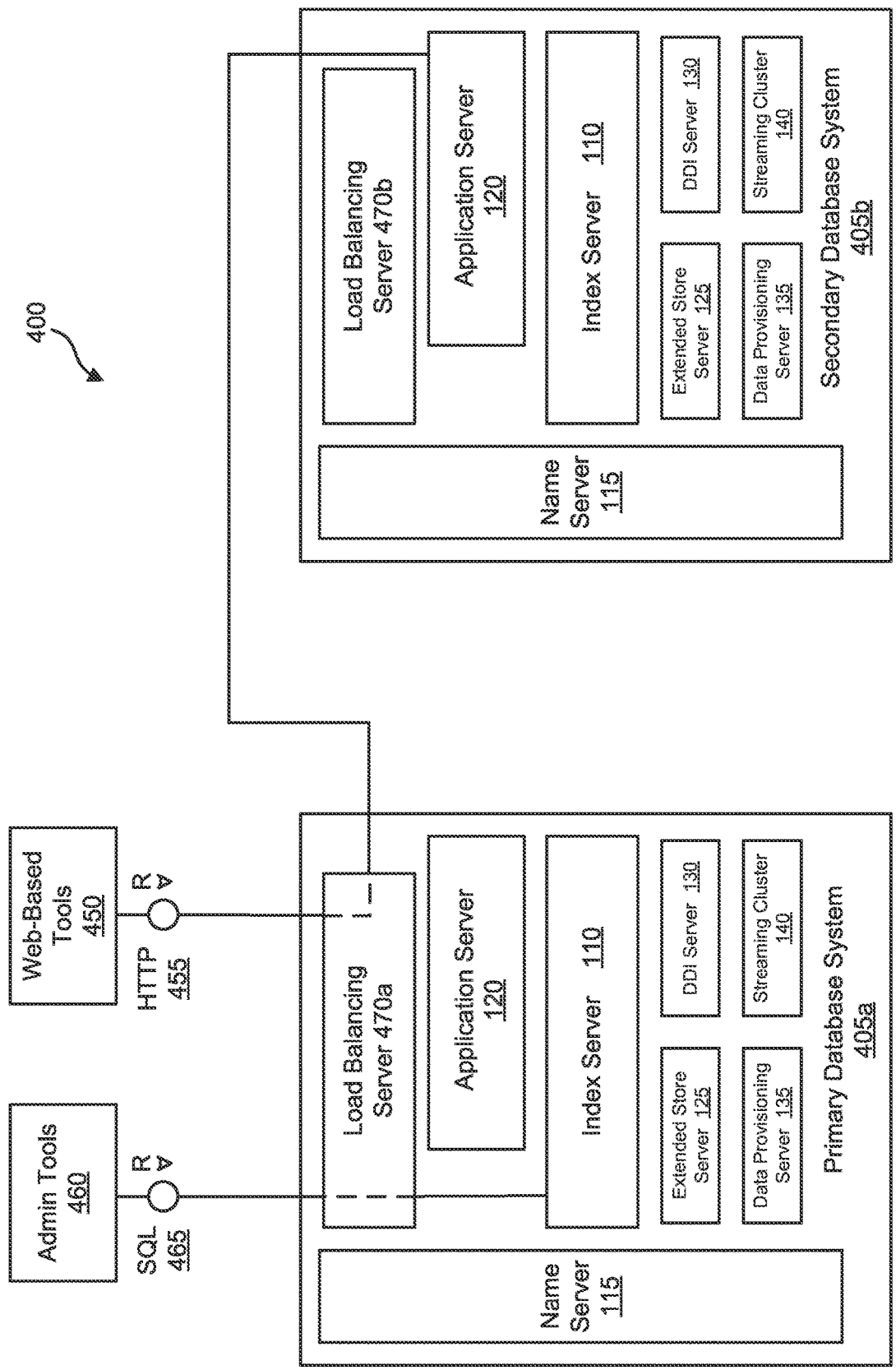
FIG. 4 is a functional flow diagram illustrating an architecture to support load balancing between a primary database system and a secondary database system, which serves as hot-standby to the primary database system, for use in connection with the current subject matter.

FIG. 4 is a functional flow diagram illustrating an architecture 400 to support load balancing between a primary database system, or primary system 405a and a secondary database system, or secondary system 405b, which serves as hot-standby to primary system 405a. Each of the primary system 405a and the secondary system 405b may be a single instance system, similar to database system 105 depicted in FIG. 1, or each may be a distributed variation of database system 105 as depicted in FIG. 2. Such an architecture 400 may be useful in a high availability data system, or in a disaster recovery system, or in a combination HA/DR system.

Each of the primary system 405a and secondary system 405b may include a load balancing functionality. Such load balancing functionality may for example be contained within a distinct load balancing server 470a or 470b. But, such load balancing functionality may be managed by any suitable processing system. For example, the application server 120 of the primary system may also manage the load balancing of requests issued to the application server of the primary system 405a, sending requests to the secondary system 405b as necessary to maintain a well distributed workload.

As depicted in FIG. 4, each of the primary system 405a and the secondary system 405b includes a load balancing server 470a and 470b which respectively receive requests from user applications directed to the primary system 405a or the secondary system 405b. Such request may come from either admin tools 460 or web-based tools 450, or any other user application. Upon receiving a request a load balancing server, e.g. 470a, determines how to distribute the workload. As depicted load balancing server 470a routes an SQL request 465 from admin tools 460 to the index server 110 of the primary system 405a, while routing an HTTP request 455 from web-based tools 450 to the application server 120 of the secondary system 405b.

Load balancing of resources between a primary system 405a and a secondary system 405b can give rise to a number of complicating issues. For example, if either of the requests 455, 465 requires writing to one or more data tables, or modifying a data table, then the two systems 405a, 405b will diverge. After many instances of write requests being distributed between the primary system 405a and the secondary system 405b, the two systems would be substantially different, and likely unusable. In another example, an application request, e.g. 465, may perform a write transaction that is followed by a read transaction, e.g. 455, related to the data written by the write request 465. If the write request is allocated to the primary system 405a, the read request would obtain a different result depending on whether the subsequent read transaction is carried out by the primary system 405a or by the secondary system 405b.

Load balancing in a HA/DR system, by distributing a portion of the workload of a primary data system to a hot-standby or backup system must be done in a way that does not disturb the principal purpose of the backup system, which is to substantially eliminate downtime in a high availability system by enabling quick and efficient recovery of operations. In other words, as a rule, load balancing cannot break the hot-standby. Given this principal purpose, any solution that enables load balancing of workload between a primary system and a backup system must maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications.

Figure 5:
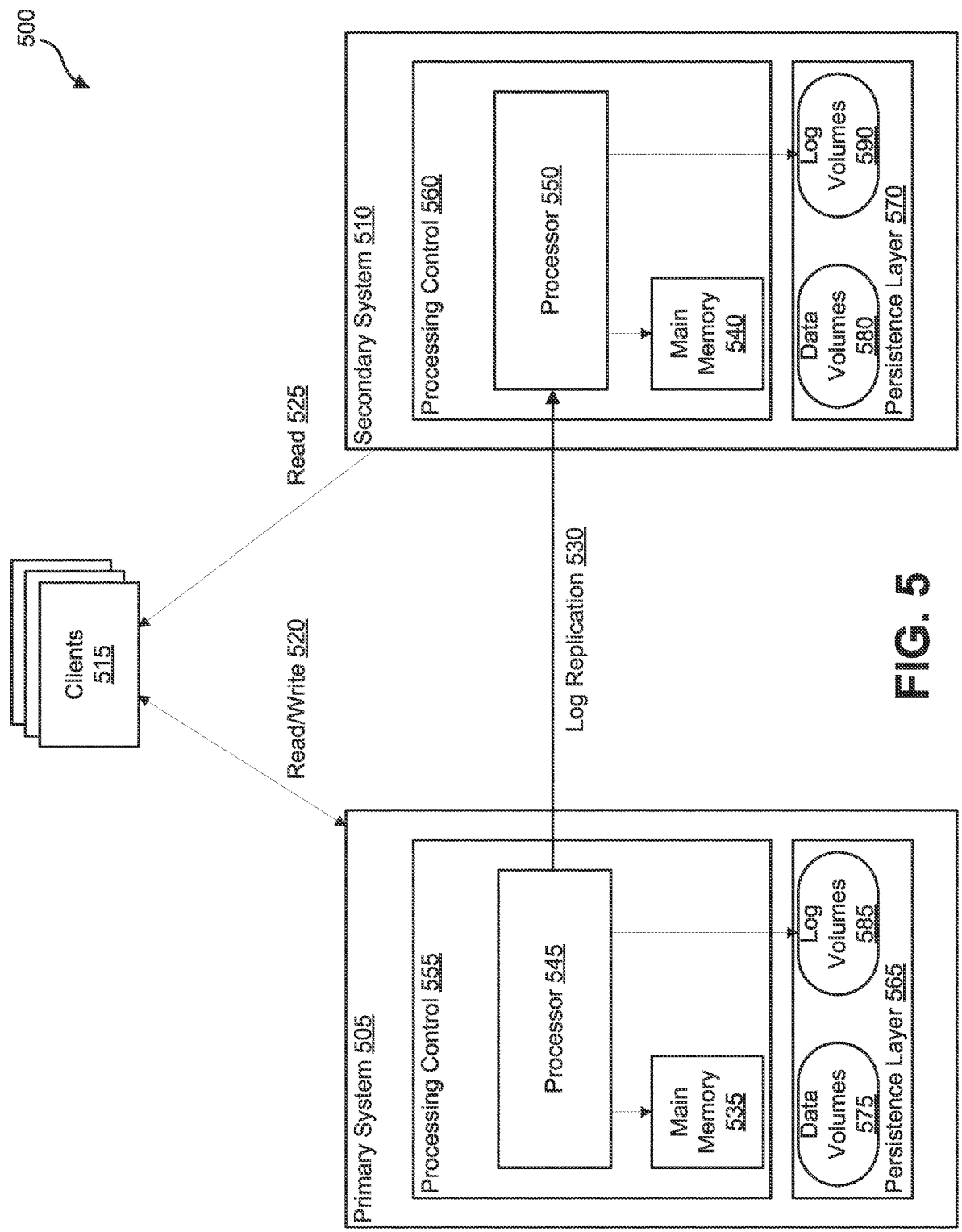
FIG. 5 depicts one example solution to managing load balancing in a HA/DR system.

FIG. 5 depicts one example solution to managing load balancing in a HA/DR system 500. HA/DR system 500 includes a primary system 505 and a secondary system 510 and is capable of load balancing between primary system 505 and secondary system 510 without interfering with the hot-standby functionality of the secondary system 510. Each of primary system 505 and secondary system 510 may be single instance database systems similar to database system 105 depicted in FIG. 1, or a distributed variation of database system 105 as depicted in FIG. 2. Furthermore, each of primary system 505 and secondary system 510 may comprise less, more or all the functionality ascribed to index server 110, 300, name server 115, application server 120, extended store server 125, DDI server 130, data provisioning server 135, and stream cluster 140. But, for simplicity of illustration HA/DR system 500 has been simplified to highlight certain functionality by merely distinguishing between processing control 555, 560 and a persistence layer 565, 570 of each respective system 505, 510.

A collection of clients may each maintain an open connection to both the primary system 505 and the secondary system 525. For example, client 515 maintains a read/write connection 520 to the primary system 505 and a read only connection 525 to the secondary system 510. Alternatively, client 515 may maintain a read/write connection with each of the primary system 505 and the secondary system 510, while processes within the secondary system 510 itself prohibit execution of any requests that require a write transaction upon the secondary system while it is in backup mode. Management of load balancing of the workload required by a client application executing at client 515 may be managed by the client 515 application itself. Alternatively, a client 515 application may submit a query request to the primary system 505. A process control 555 load balancing process executing on processor 545 then may determine where the query should be executed and replies to the client 515 with instructions identifying which system the client 515 should issue the query to.

Primary system 505 may include an in-memory database in which substantially all actively used data may be kept and maintained in main memory 535 so that operations can be executed without disk I/O, which requires accessing disk storage. Active operations of applications within processing control 555 may cause processor 545 to read and write data into main memory 535 or to disk in the persistence layer 565. Processing control 555 applications also cause processor 545 to generate transaction logs for capturing data transactions upon the database, which processor 545 then persists in the log volumes 585. As substantially all actively used data may reside in-memory, processing control 555 may interact primarily with data held in main memory while only resorting to data volumes 575 for retrieving and writing less often used data. Additional processes within processing control 555 may be executed by processor 545 to ensure that in-memory data is persisted in persistence layer 565, so that the data is available upon restart or recovery.

Primary system 505 may be the primary operational system for providing the various functionality necessary to support 24/7 operations for an organization. Secondary system 510 may be a hot-standby, ready to come online with minimal recovery time so as to minimize downtime. Secondary system 510 may be an identical physical system as primary system 505, and may be configured in a substantially identical manner in order to enable the secondary system 510 to provide all the same functionality as primary system 505. For example, processing control 560 may include all the same applications and functionality as processing control 555, and persistence layer 570 may include data volumes 580 and log volumes 590 that are configured in an identical manner as data volumes 575 and log volumes 585 respectively. Secondary system 510 may also include an in-memory database kept and maintained primarily in main memory 540.

Primary system 505 and secondary system 510 differ in that all requests, from client 515 or otherwise, that require a write transaction are executed only in primary system 505. Primary system 505 and secondary system 510 further differ in that all write transactions to persistent objects are prohibited by the secondary system 510. In order to propagate changes to the data or the underlying schema from the primary system 505 to the secondary system 510, processor 545 also replicates 530 transaction logs directly to the process control 560 of the secondary system 510. Process control 560 includes one or more applications that cause processor 550 to then replay the transaction logs replicated from the primary system 505, thereby replaying the transactions at the secondary system 510. As transaction logs are replayed, the various transactions executed at the primary system become reflected in the secondary system 510. In order to ensure both the HA functionality and the load balancing functionality, replay of the transaction logs at the secondary system places data in main memory 540, and also persists any data committed in the primary system to persistence layer 570 to be stored by data volumes 580. Replay of the transaction logs at the secondary system 510 may also results in the transaction logs being persisted in log volumes 590.

Transaction logs may be replicated in different ways. Where maintaining a standby system in as close to the same state as the primary system is an important factor, logs may be replicated synchronously meaning that the primary system will not commit a transaction until the secondary successfully responds to the log replication. One appreciates that this will slow performance of the primary system. Conversely, where performance of a primary system is a priority, logs may be replicated asynchronously, in which case the primary operation proceeds with committing transactions without waiting for a response. Various tradeoffs can be made between these two scenarios to achieve a proper level of performance while ensuring replication of critical data.

It will be appreciated from the detailed description above that such a secondary system in standby mode, such as secondary system 510, can only be as current as its most recently replayed transaction logs. Transaction logs are replicated and replayed at the secondary system 510 only after a transaction executes in the primary system 505. Secondary system 510, therefore, is always slightly behind an associated primary system 515. Also, there is no guarantee that a query routed to the primary system in a load balancing effort will be executed before, during or after a particular transaction log is replayed. Thus, the state of the primary system 505 and the state of the secondary system will rarely if ever be identical. But, by addressing certain concerns, secondary system 510 may be kept in a state substantially close to the same state as the primary system 505 such that the workload required by many operations can be supported by the secondary 510. These are just a few of the issues to be addressed in order to provide a robust load balancing implementation in a HA/DR architecture, where the hot-standby system also functions to carry a portion of the workload. One or more solutions to issues arising by the load balancing solution depicted in FIG. 5 are now addressed.

Figure 6:
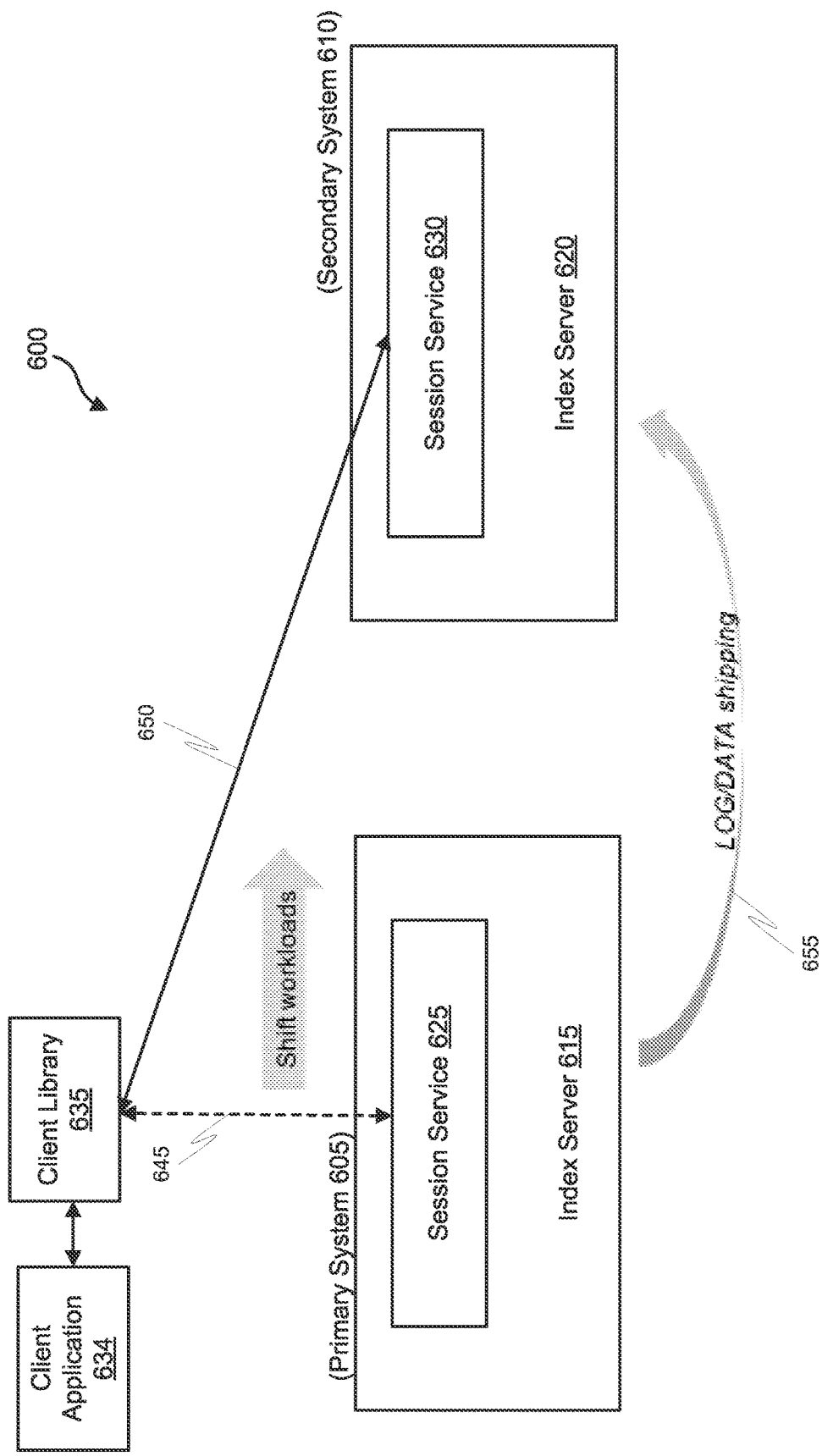
FIG. 6 depicts another example solution to managing load balancing in a HA/DR system.

FIG. 6 depicts another example solution to managing load balancing in a HA/DR system 600. HA/DR system 600 includes a primary database system 605, a secondary database system 610, and a communication channel 655 for propagating transaction logs and changes to data or the underlying schema from the primary system 605 to the secondary system 610. The HA/DR system 600 is capable of load balancing between primary system 605 and secondary system 610 without interfering with the hot-standby functionality of the secondary system 610. Each of primary system 605 and secondary system 610 may be single instance database systems similar to database system 105 depicted in FIG. 1, or a distributed variation of database system 105 as depicted in FIG. 2. Furthermore, each of primary system 605 and secondary system 610 may comprise less, more or all the functionality ascribed to primary system 505 and secondary system 510, index server 110, 300, name server 115, application server 120, extended store server 125, DDI server 130, data provisioning server 135, and stream cluster 140. But, for simplicity of illustration HA/DR system 600 has been simplified to highlight certain functionality by merely distinguishing between index server 615, 620 and a session service 625, 630 of each respective system 605, 610. Also, each of index server 615, 620 may comprise less, more or all the functionality ascribed to index server 110, 300 and each of session service 625, 630 may comprise less, more or all the functionality ascribed to connection and session management component 302.

A client application 634 may invoke one or more client libraries 635 to establish connections with the primary and secondary server systems 605, 610. As a result, one or more client libraries 635 may each maintain an open connection to both the primary system 605 and the secondary system 610. For example, client library 635 may maintain a read/write connection 645 to the primary system 605 and a read only connection 650 to the secondary system 610. Alternatively, client library 635 may maintain a read/write connection with each of the primary system 605 and the secondary system 610, while processes within the secondary system 610 itself prohibit execution of any requests that require a write transaction upon the secondary system while it is in backup mode.

Management of load balancing of the workload required by a client application 634, in this example, is managed by both the client library 635 and the primary system 605. The client library 635 may submit a query request to the session service 625 in the index server 615 of the primary system 605. The client application 634 may indicate in the query request through a hint that it is acceptable (or preferable) to the client application 634 to have the query executed at the secondary system 610. A load balancing process executing on a processor within the index server 615 in the primary system 605 then may determine where the query should be executed and replies to the client 615 with instructions identifying the system to which the client 615 should issue the query. In this example, the index server 615 determines that the query should be executed at the secondary system 610 and instructs the client library 635 to issue the query to the secondary system 610. The hint may indicate to the primary system 605 the preference of the client library 635 for the query to execute at the secondary system if possible.

Figure 7:
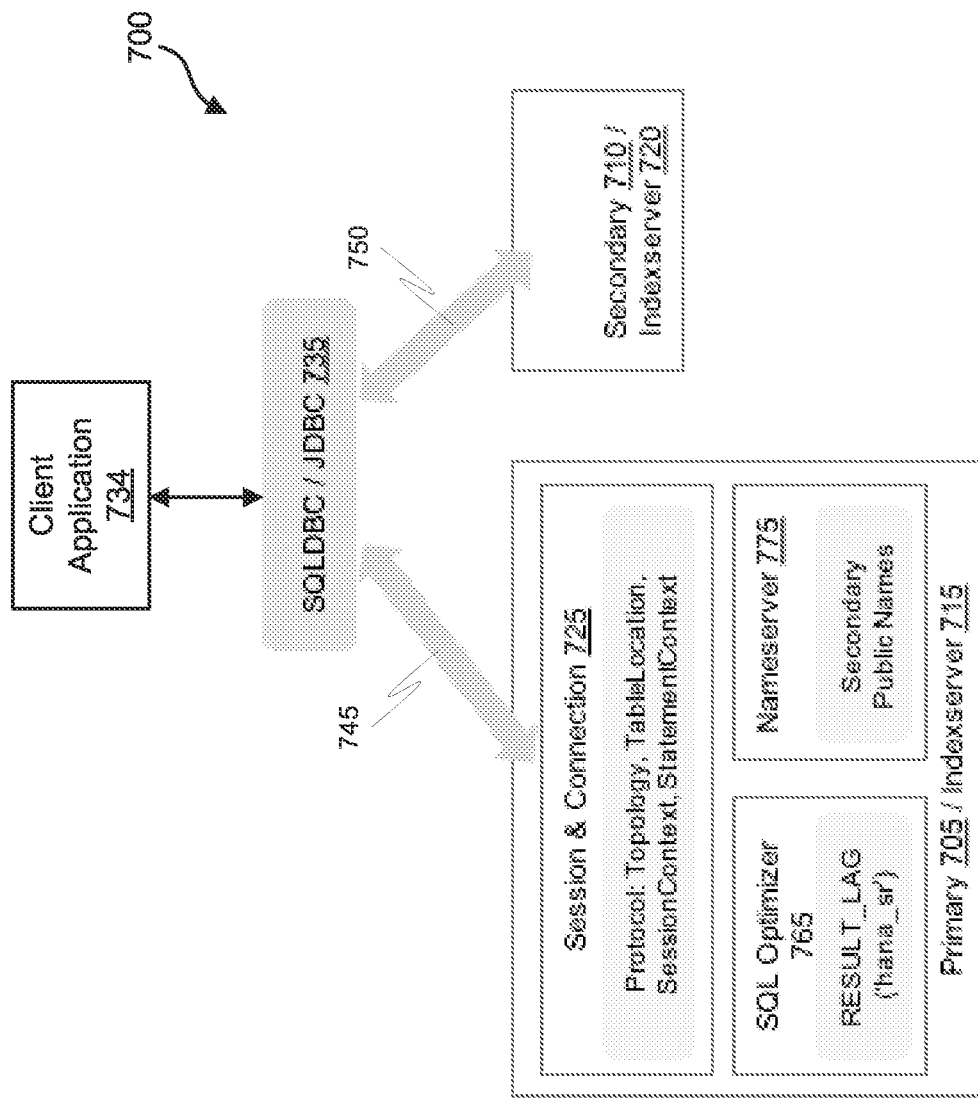
FIG. 7 depicts an example architecture diagram for implementing HINT-based routing.

FIG. 7 depicts another example solution to managing load balancing in a HA/DR system 700. HA/DR system 700 includes a primary database system 705 and a secondary database system 710 and is capable of load balancing between primary system 705 and secondary system 710 without interfering with the hot-standby functionality of the secondary system 710. Each of primary system 705 and secondary system 710 may be single instance database systems similar to database system 105 depicted in FIG. 1, or a distributed variation of database system 105 as depicted in FIG. 2.

Furthermore, each of primary system 705 and secondary system 710 may comprise less, more or all the functionality ascribed to primary system 605, 505 and secondary system 610, 510, index server 110, 300, name server 115, application server 120, extended store server 125, DDI server 130, data provisioning server 135, and stream cluster 140. But, for simplicity of illustration HA/DR system 700 has been simplified to highlight certain functionality by merely distinguishing between index server 715, 720 of each respective system 705, 710 and a session and connection service 725, a SQL optimizer 765, and a name server 775 of system 705. Also, each of index server 715, 720 may comprise less, more or all the functionality ascribed to index server 110, 300, session and connection service 725 may comprise less, more or all the functionality ascribed to connection and session management component 302, 625, SQL optimizer 765 may comprise less, more or all the functionality ascribed to SQL processor 312, and name server 775 may comprise less, more or all the functionality ascribed to name server 115.

A client application 734 may invoke one or more client libraries 735 to establish connections with the primary and secondary server systems 705, 710. As a result, one or more client libraries 735 may each maintain an open connection to both the primary system 705 and the secondary system 710. For example, client library 735 may maintain a read/write connection 745 to the primary system 705 and a read only connection 750 to the secondary system 710. Alternatively, client library 735 may maintain a read/write connection with each of the primary system 705 and the secondary system 710, while processes within the secondary system 710 itself prohibit execution of any requests that require a write transaction upon the secondary system while it is in backup mode.

Management of load balancing of the workload required by a client application 734, in this example, is managed by both the client library 735 and the primary system 705. The client library 735 may submit a query request to the session service 725 in the index server 715 of the primary system 705. The client application 734 may indicate in the query request through a hint that it is acceptable (or preferable) to the client application 734 to have the query executed at the secondary system 710. A SQL optimizer 765 may parse the query request and recognize the hint regarding query execution at the secondary system 710. A load balancing process executing on a processor within the index server 715 in the primary system 705 then may determine where the query should be executed and replies to the client 715 with instructions identifying the system to which the client 715 should issue the query.

If it is determined that the query should be executed at the secondary system 710, the index server 715 may retrieve the secondary system's public name via a name server 775 and provide the secondary system's public name to the client library 735 in a reply. The client library 735 may utilize a topology cache to store location information for data and may need to have its topology cache extended to be made aware of the secondary system 710.

In this example, the index server 715 determines that the query should be executed at the secondary system 710 and instructs the client library 735 to issue the query to the secondary system 710. The hint may indicate to the primary system 705 the preference of the application 734 for the query to execute at the secondary system if possible.

When executing a query at the secondary site, the secondary site could return old data, for example, when the replay of delta logs is delayed. The client application 734 may specify a replication delay parameter (e.g., a time in seconds) as an acceptable lag time for the data wherein the lag time is the difference between when a write transaction was committed on the primary system and when it has been replayed and can be read by the application on the secondary. The secondary system 710 may provide data to the client library 735 in response to a query only when a per-table result lag does not exceed the replication delay parameter. Alternatively, the secondary system 710 may instruct the client library 735 to route the query to the primary database system when the per-table result lag exceeds the replication delay parameter. Or, the secondary system 710 may provide both the data responsive to the query and a fallback indication to the client application when the per-table result lag exceeds the replication delay parameter.

Figure 8:
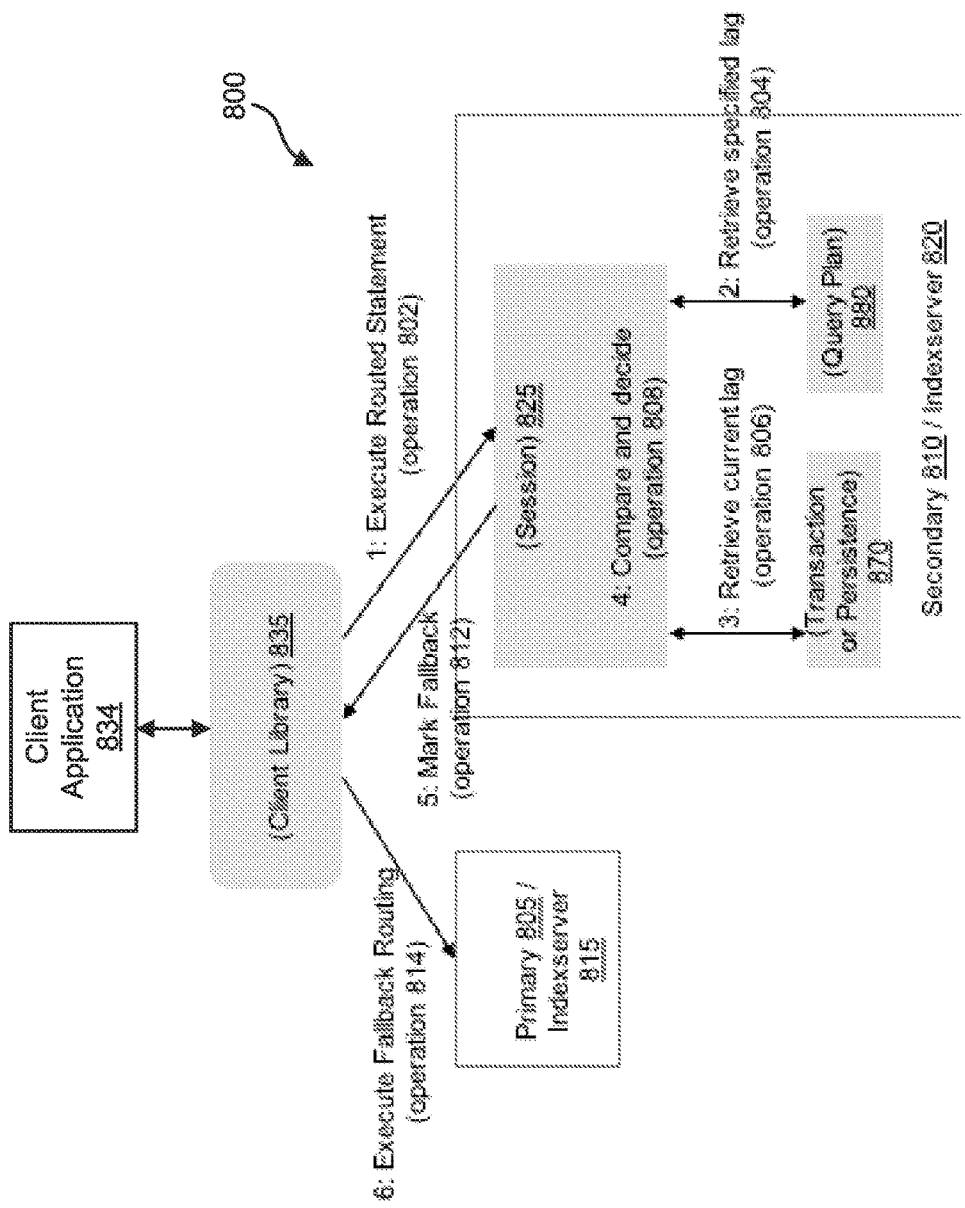
FIG. 8 depicts example operations of a HA/DR system when the data lag for data responsive to a query exceeds a replication delay parameter.

FIG. 8 depicts example operations of a HA/DR system 800 when the data lag for data responsive to a query exceeds a replication delay parameter. HA/DR system 800 includes a primary database system 805 and a secondary database system 810. Each of primary system 805 and secondary system 810 may be single instance database systems similar to database system 105 depicted in FIG. 1, or a distributed variation of database system 105 as depicted in FIG. 2. Furthermore, each of primary system 805 and secondary system 810 may comprise less, more or all the functionality ascribed to primary system 705, 605, 505 and secondary system 710, 610, 510, index server 110, 300, name server 115, application server 120, extended store server 125, DDI server 130, data provisioning server 135, and stream cluster 140. But, for simplicity of illustration HA/DR system 800 has been simplified to highlight certain functionality by merely distinguishing between index server 815, 820 of each respective system 805, 810 and a session and connection service 825, a transaction manager or persistence layer 870, and a query planning engine 880. Also, each of index server 815, 820 may comprise less, more or all the functionality ascribed to index server 110, 300, 615, 715; session and connection service 825 may comprise less, more or all the functionality ascribed to connection and session management component 302, 625,725; transaction manager or persistence layer 870 may comprise less, more or all the functionality ascribed to transaction manager 344 and/or persistence layer 345, and query planning engine 880 may comprise less, more or all the functionality ascribed to query planning engine 318.

After receiving instructions to route a query to the secondary system 810, the client library 835, invoked by the client application 834, instructs the secondary system 810 to execute a routed query statement (operation 802). The query planning engine 880 retrieves the specified lag (i.e., replication delay parameter) from the query (operation 804). The transaction manager or persistence layer 870 retrieves the current data lag for the data responsive to the query (operation 806). The session and connection service 825 compares the specified lag to the current data lag and decides on whether data responsive to the query should be provided to the client library 835 (operation 808). When the current data lag exceeds the specified lag, the secondary system will notify the client library (operation 812). Upon receiving notification that the current data lag exceeds the specified lag, the client library 835, reroutes the query to the primary system 805 for execution (operation 814).

The primary system 605 and the secondary system 610 can be configured to provide a replication option referred to as Asynchronous Table Replication (ATR), which focuses on load balancing and scalable read performance by replicating a selected list of tables within a single data center.

Figure 9:
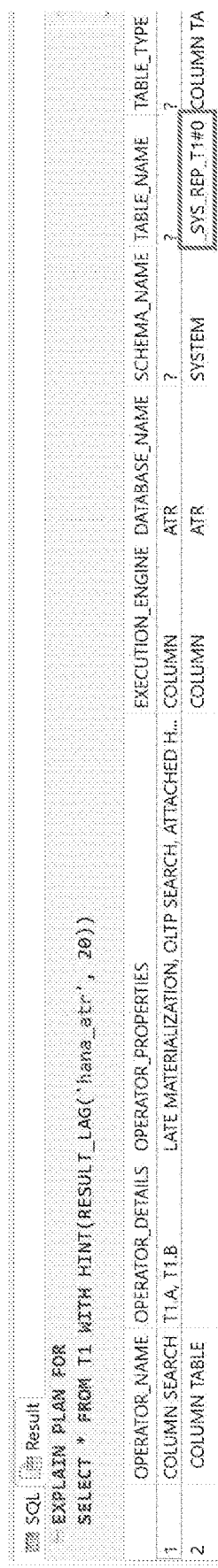
FIG. 9 depicts an interface for defining a query having hint routing.

A query with an ATR hint will be executed on a replica table if the actually computed result lag (i.e. current replay delay of the replica node) is no greater than the one specified by user. For example, see diagram 900 of FIG. 9 and the following:

```
--Create table T1 on master indexserver
    create column table T1(a int, b int) at 'lint12rt:35003';
    --A replica table of T1 named _SYS_REP_T1#0 is created on a slave
indexserver, T1 is called source table
and _SYS_REP_T1#0 is called replica
table
    alter table T1 add asynchronous replica at 'lint12rt:35040';
    --Enable replica table _SYS_REP_T1#0
    ALTER TABLE T1 ENABLE ASYNCHRONOUS REPLICA;
    --Define a query hint using ATR
    ALTER SYSTEM ALTER CONFIGURATION
    ('indexserver.ini', 'system') SET
('hint_result_lag_hana_atr', 'enable_features') =
'atr' WITH RECONFIGURE;
    --Execute a query with ATR hint, if the actually computed result lag is
no greater than 20 seconds, then the
query is executed on _SYS_REP_T1#0
instead of source table T1, which is shown in Figure 1
    SELECT * FROM T1 WITH HINT(RESULT_LAG('hana_atr', 20));
```

As mentioned above, the query will be executed on replica table if the actually computed result lag is no greater than the one specified by user, otherwise it will fall back to recompile and execute on source table. The actual result lag calculation in some variations is called per-node result lag computation, i.e. it is calculated during query execution by subtracting the minimum source commit time of related indexservers where the query involved tables each having a replica reside from current time.

That is to say, currently result lag is calculated per-node (indexserver) level, which is not accurate, e.g. assuming tables TABLE1 with last commit time t1 and TABLE2 with last commit time t2, where t1>t2; both tables reside on indexserver 1, and each has a replica named _SYS_REP_TABLE1 #0 and _SYS_REP_TABLE2 #0 respectively residing on indexserver 2.

Consider the query below:
SELECT*FROM TABLE1 WITH HINT(RESULT_LAG ('hana_atr', 20))

According to some approaches, result lag=current time–last commit time t2 of table T2 (the minimum commit time on indexserver 1). With this arrangement, a greater result lag is gained, which might result in that replica _SYS_REP_T-ABLE1 #0 being given up upon query execution which, in turn, causes the query to unnecessarily fall back to execute on source table TABLE1. This occurs despite TABLE2 not being related to the query.

Figure 10:
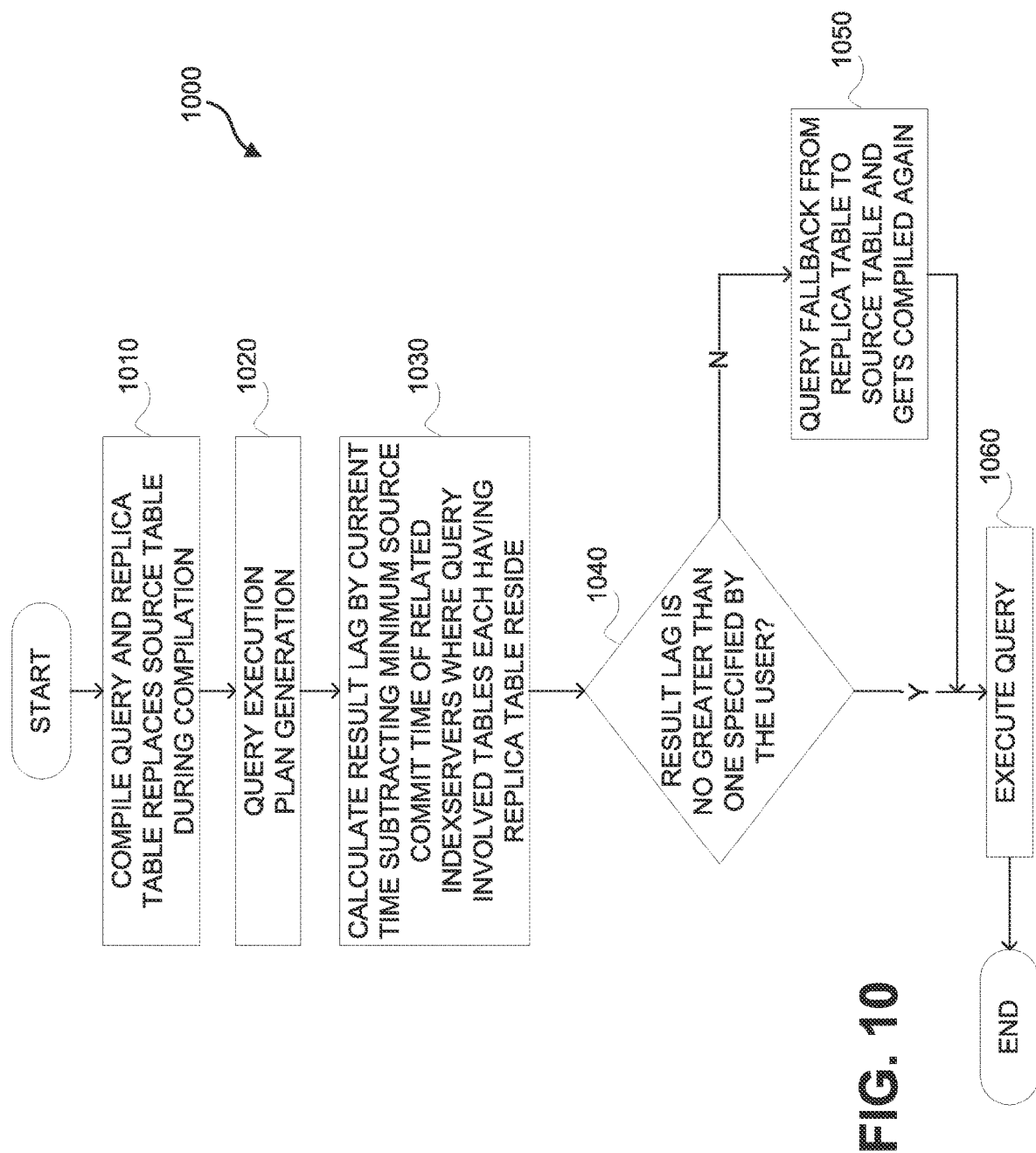
FIG. 10 depicts a flow diagram for an example process for more precisely calculating result lag to allow for more efficient workload balancing/distribution.

FIG. 10 is a process flow diagram 1000 which illustrates an arrangement for per-table result lag computation, which is more accurate, i.e. calculating result lag based on involved tables of the query, not based on related indexservers where the query involved tables each having a replica reside. A query is received from a client application and, at 1010, the query is compiled such that the replicable tables replaces source tables. Based on the compiled query, at 1020, a query execution plan is generated which specifies various aspects on how the query will be executed. Thereafter, at 1030, a result lag is calculated on a per-table basis. In some variations, the result lag is calculated by subtracting a minimum commit time of related index servers having tables implicated by the query have a corresponding replica. If the calculated result lag is lower than a pre-defined threshold (e.g., a user specified threshold), then the query can, at 1060, be directly executed using the query execution plan. Otherwise, if the result lag is above the pre-defined threshold, then at 1050, the query falls back from the replica table to the source table (due to the replica table not being available, etc.) causing the query to get compiled again.

The per-table result lag computation can be as follows:
(1) Maintain a map: SourceCommitTimeMap<SourceTableOid, LastCommitTime> by periodically (each 10 seconds) getting the last commit time for each source table having a replica;
(2) Maintain the last replayed transaction commit timestamp for each replica table, call it LastReplayedTxnCommitTime;
(3) For each source table, say table Tab1 here for example:

```
if (SourceCommitTimeMap.probe(Tab1_OID) <
LastReplayedTxnCommitTime)
    // This means that the all transactions involving this table have been
replayed. Hence, the conservative result
lag should be only as much as the time
which has passed since the last time the
timer thread (which triggers every 10
secs) was invoked
        ResultLag_Tab1 = (CurrentWallClockTime –
LastTimerThreadCollectionWallClockTime );
else
    //This means that there are some
commits on this table beyond what we
have replayed in the ATR replayer
    ResultLag_Tab1 = ( CurrentWallClockTIme–
LastTimerThreadCollectionWallClockTime) +
(SourceCommitTimeMap.probe(Tab1_OID) –
LastReplayedTxnCommitTime);
```

(4) For a query involving multiple source tables each having a replica, the actual result lag is the maximum of result lags computed across all replicas.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer system comprising:
   one or more processors;
   a primary database system implemented by the one or more processors; and
   a secondary database system implemented by the one or more processors, the secondary database system configured as a hot-standby system for the primary database system that is capable of providing at least a minimum amount of essential functionality of the primary database system during a disruption to the primary database system;
   wherein the primary database system is configured by programming instructions, executable on the computer system, to cause the one or more processors to:
   compile a query received from a client application, wherein the query indicates one or more source tables have corresponding replicate tables, wherein the compiling comprises replacing the one or more source tables with the corresponding replicate tables;
   generate a query execution plan based on the compiled query;
   determine a per-table result lag based on minimum commit times of the corresponding replicate tables;
   compare the per-table result lag with a predefined threshold; and
   responsive to a determination that the per-table result lag exceeds the predefined threshold, recompile the query by falling back to the one or more source tables from the corresponding replicate tables.

2. The computer system according to claim 1, wherein the primary database system is configured by programming instructions, executable on the computer system, to further cause the one or more processors to:
   responsive to a determination that the per-table result lag does not exceed the predefined threshold, directly execute the query plan without recompiling the query.

3. The computer system according to claim 1, wherein the per-table result lag is determined by calculating differences between current time and the minimum commit times of the corresponding replicate tables.

4. The computer system according to claim 3, wherein if two or more source tables are implicated by the query and have corresponding replica tables, the per-table result lag is a maximum of the calculated differences.

5. The computer system according to claim 1, wherein the primary database system is configured by programming instructions, executable on the computer system, to further cause the one or more processors to invoke one or more client libraries by the client application and establish open connections between the one or more client libraries to both the primary database system and the secondary database system.

6. The computer system according to claim 5, wherein the open connections between the one or more client library and the primary database system are read/write connections.

7. The computer system according to claim 5, wherein the open connections between the one or more client library and the secondary database system are read only connections.

8. The computer system according to claim 1, wherein the primary database system is configured by programming instructions, executable on the computer system, to further cause the one or more processors to identify a routing hint from the query, wherein the routing hint indicates that workload from the query may be shifted to the secondary database system.

9. The computer system according to claim 1, wherein the primary database system is configured by programming instructions, executable on the computer system, to further cause the one or more processors to periodically update a map comprising last commit times of source tables that have corresponding replica tables.

10. The computer system according to claim 9, wherein the primary database system is configured by programming instructions, executable on the computer system, to further cause the one or more processors to maintain last replayed transaction commit timestamps of the corresponding replica tables.

11. A computer-implemented method in a computer system comprising a primary database system and a secondary database system, the secondary database system configured as a backup system for the primary database system that is capable of providing at least a minimum amount of essential functionality of the primary database system during a disruption to the primary database system, the method comprising:
compiling a query received from a client application, wherein the query indicates one or more source tables have corresponding replicate tables, wherein the compiling comprises replacing the one or more source tables with the corresponding replicate tables;
generating a query execution plan based on the compiled query;
determining a per-table result lag based on minimum commit times of the corresponding replicate tables;
comparing the per-table result lag with a predefined threshold; and
responsive to a determination that the per-table result lag exceeds the predefined threshold, recompiling the query by falling back to the one or more source tables from the corresponding replicate tables.

12. The method according to claim 11, further comprising:
responsive to a determination that the per-table result lag does not exceed the predefined threshold, directly executing the query plan without recompiling the query.

13. The method according to claim 11, wherein determining the per-table result lag comprises calculating differences between current time and the minimum commit times of the corresponding replicate tables.

14. The method according to claim 13, wherein determining the per-table result lag comprises finding the maximum of the calculated differences if two or more source tables are implicated by the query and have corresponding replica tables.

15. The method according to claim 11, further comprising invoking one or more client libraries by the client application and establishing open connections between the one or more client libraries to both the primary database system and the secondary database system.

16. The method according to claim 15, wherein the open connections between the one or more client library and the primary database system are read/write connections, and the open connections between the one or more client library and the secondary database system are read only connections.

17. The method according to claim 11, further comprising identifying a routing hint from the query, wherein the routing hint indicates that workload from the query may be shifted to the secondary database system.

18. The method according to claim 11, further comprising periodically updating a map comprising last commit times of source tables that have corresponding replica tables.

19. The method according to claim 18, further comprising maintaining last replayed transaction commit timestamps of the corresponding replica tables.

20. A non-transitory computer readable storage medium embodying programming instructions for performing a method, the method comprising:
compiling a query received from a client application, wherein the query indicates one or more source tables have corresponding replicate tables, wherein the compiling comprises replacing the one or more source tables with the corresponding replicate tables;
generating a query execution plan based on the compiled query;
determining a per-table result lag based on minimum commit times of the corresponding replicate tables;
comparing the per-table result lag with a predefined threshold;
responsive to a determination that the per-table result lag exceeds the predefined threshold, recompiling the query by falling back to the one or more source tables from the corresponding replicate tables; and
responsive to a determination that the per-table result lag does not exceed the predefined threshold, directly executing the query plan without recompiling the query.

* * * * *